Jan. 9, 1962  G. ALFIERI  3,016,271
DISTRIBUTOR FOR PNEUMATIC BRAKING SYSTEMS
WITH VARIABLE LOAD AND STROKE
Filed Nov. 27, 1956  3 Sheets-Sheet 3

United States Patent Office 3,016,271
Patented Jan. 9, 1962

3,016,271
DISTRIBUTOR FOR PNEUMATIC BRAKING SYSTEMS WITH VARIABLE LOAD AND STROKE
Giuseppe Alfieri, Milan, Italy, assignor to Fabbrica Italiana Magneti Marelli, Milan, Italy, an Italian company
Filed Nov. 27, 1956, Ser. No. 624,684
Claims priority, application Italy Nov. 28, 1955
2 Claims. (Cl. 303—53)

This invention relates to valve mechanisms adapted to control the braking of tractor and trailer vehicles, and, more particularly, it relates to a valve control mechanism for use in braking systems comprised of a number of independent sections, that is, one section for each axle of the vehicles concerned, and a single centralized valve control mechanism adapted to establish or cut out communication, according to necessity, between the brake cylinders and reservoirs of all sections and the source of braking fluid.

It is known to all those skilled in the art of making fluid operated braking systems for tractor and trailer vehicles that very often the designer is compelled to envisage the construction of several series of a certain braking system, these series differing from one another only as regards their size, according to the requirements of vehicle manufacturers. More detailedly, the parameters which define a valve control mechanism for a certain braking system are the load and the stroke, so that a braking system which had been designed for a certain vehicle, was not adapted for operation on another vehicle, due to different loads and strokes, although the operating diagram and the general features of the braking systems for the two vehicles were, in many instances, very much the same. This fact entails, as one can easily realize, a source of expenditure which considerably increases the production cost of the vehicles.

It is thus a principal object of the present invention to provide a control valve mechanism or distributor adapted to operate under any selected load, the movable valve members of said mechanism being capable of travelling over any selected stroke according to the operational necessities of an individual braking system. Generally stated, the object outlined is attained by providing for the operation of the valve members proper of the said distributor, resilient members the bias or action of which can be chosen according to the individual load and stroke requirements to be fulfilled, those resilient members being of easy replacement whenever necessary or expedient. By choosing a proper combination of these said resilient members, it is thus possible to adapt the valve mechanism of the invention to functional requirements, i.e. load and stroke, variable over a somewhat wide range. Otherwise stated, the body of the said distributor and the lines of the braking system may be the same for different vehicles, the differences being in the different strength combination of the biasing or resilient members. In the case of coupled tractor and trailer vehicles it is desirable to operate one section of the braking system in advance of another, e.g. the trailer section in advance of the tractor section in order to avoid the damage and dangers inherent to the over-running of one of the coupled vehicles by the other one.

The most common drawback experienced with the devices suggested by the prior art is that this "advance" in the braking action cannot be varied as to its magnitude, so that the pressures acting in the two sections, that is, tractor and trailer, of the braking system, are uneven throughout the braking action and will give disuniform braking forces resulting in pulling of the tractor by the trailed vehicle or vice-versa.

The invention provides a control valve mechanism in which a system of adjustable resilient or biasing members is capable of applying a turning moment to a lever capable of actuating the valve members proper of said valve mechanism, so that said actuating lever operates in the sense of supplying the compressed braking fluid to one section of the braking system before feeding the other section(s) of the braking system with braking fluid. By so doing, the desired advance of operation of a section with respect to another section of the same braking system is obtained.

The prior art discloses control valve mechanisms in which this "advance" or "pregression" of the operation of an individual valve member with respect to another one is contemplated, but prior art mechanisms are objectionable in that the advance is not adjustable nor the replacement of a resilient or valve biasing member a readily practicable operation.

The invention furthermore provides a device for limiting the pressure of the incoming fluid into the "advanced" braking section within a preselected range.

According to a preferred embodiment of the invention, the bottom wall of the housing of the valve control mechanism has a stepped configuration so that an abutment is provided for one end of the lever that actuates the valve members proper of the device, as will be explained more in detail hereinafter.

Another embodiment of the instant invention provides two adjustable screw members, installed and operable through the mechanism casing, which are intended for calibrating the advance of a braking section with respect to the others so as to adjust, annul or even invert the order of advance, that is, to "advance" a section which had formerly "lagged" with respect to other section(s) or vice-versa.

This latter provision considerably broadens the versatility of the device of the invention.

The invention will be described hereinafter in connection with some operative embodiments thereof illustrated by way of example only in the accompanying drawings.

Figure 1:
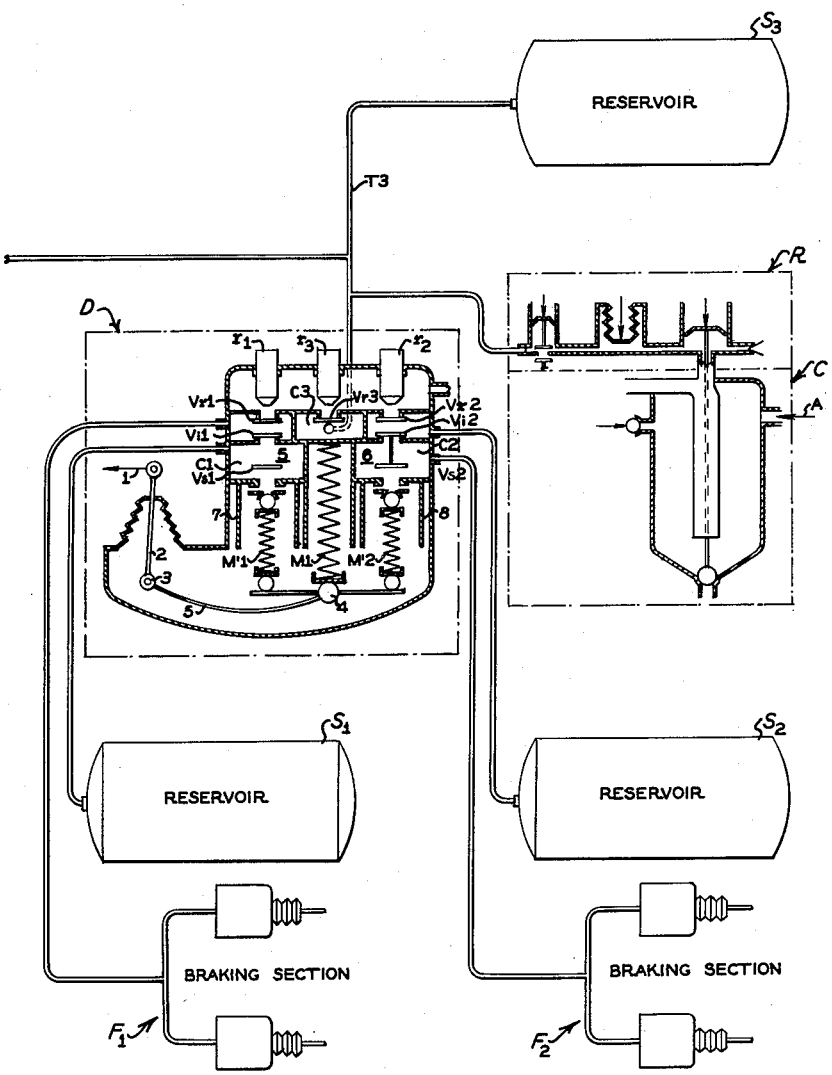
FIG. 1 is an elementary diagram illustrating the operative principle of the valve control mechanism of the invention.

The examples described herein and illustrated in the drawings refer, for the sake of simplicity, to a so-called "duplex" braking system, that is a braking system comprised of two sections only: it is apparent to those skilled in the art that the invention is as well applicable to "triplex" systems or also to braking systems composed of a greater number of braking sections.

Briefly stated, the valve control mechanism diagrammatically shown in FIG. 1 comprises a casing, a plurality of spring-biased valve members housed in said casing; each of said biased valve members being adapted to control the opening of fluid inlet and outlet parts formed in said casing, an actuating toggle for thrusting said valve members against the bias of the respective springs; a bell-crank lever for lifting said actuating toggle and pivotally connected to one end thereof, and a biasing member mounted intermediate every two adjacent spring biased valve members for biasing said bell-crank lever.

Thus, the magnitude of the bias of said intermediate resilient member can be adjusted according to the requirements of any individual braking system.

In FIG. 1 the braking system diagrammatically shown comprises two braking sections, namely: section $F_1$ fed by reservoir $S_1$ and section $F_2$ fed by reservoir $S_2$, respectively. These sections, which can correspond the one to a tractor and the other to a trailer vehicle, are controlled by the control mechanism D which is the subject-matter proper of the invention.

In FIG. 1 is also shown ancilliary apparatus commonly employed in braking systems of the kind referred to herein. These are, a supplementary reservoir $S_3$ for feeding compressed air to the horns, windshield wipers of the vehicle, a pressure regulator R and a cleaner device C. The arrow A represents the direction of delivery of a source of compressed air, such as from an air compressor not shown. The ancilliary apparatus listed hereinabove, as well as the compressor, are not described in detail since they are not a part of the invention and no claim is made thereto.

The control valve mechanism D (FIG. 1) is equipped with two cocks, $r_1$ and $r_2$, connected to the braking fluid supply reservoirs $S_1$ and $S_2$, respectively, a third cock, $r_3$, connected to a supplementary supply line T3 opening at the one end into a supplementary reservoir $S_3$ and at the other end into a chamber C3 formed in the casing of the valve mechanism D. The supplementary line T3 provides the fluid necessary to operate the ancilliary apparatus, so that possible leakages occurring in these ancilliary apparatus do not unfavorably affect the operability of the braking system proper. Cocks $r_1$, $r_2$ and $r_3$ are spear valves used to intercept the passage between the reservoir pressure chamber common to all the sections and the precompression chamber of the individual sections $C_1$ and $C_2$ so as to enable any section to be cut out if it is out of order.

Valves Vr1, Vr2 and Vr3 are check-valves so placed as to control the passage between the above-mentioned chamber and the corresponding sections.

Figure 2:
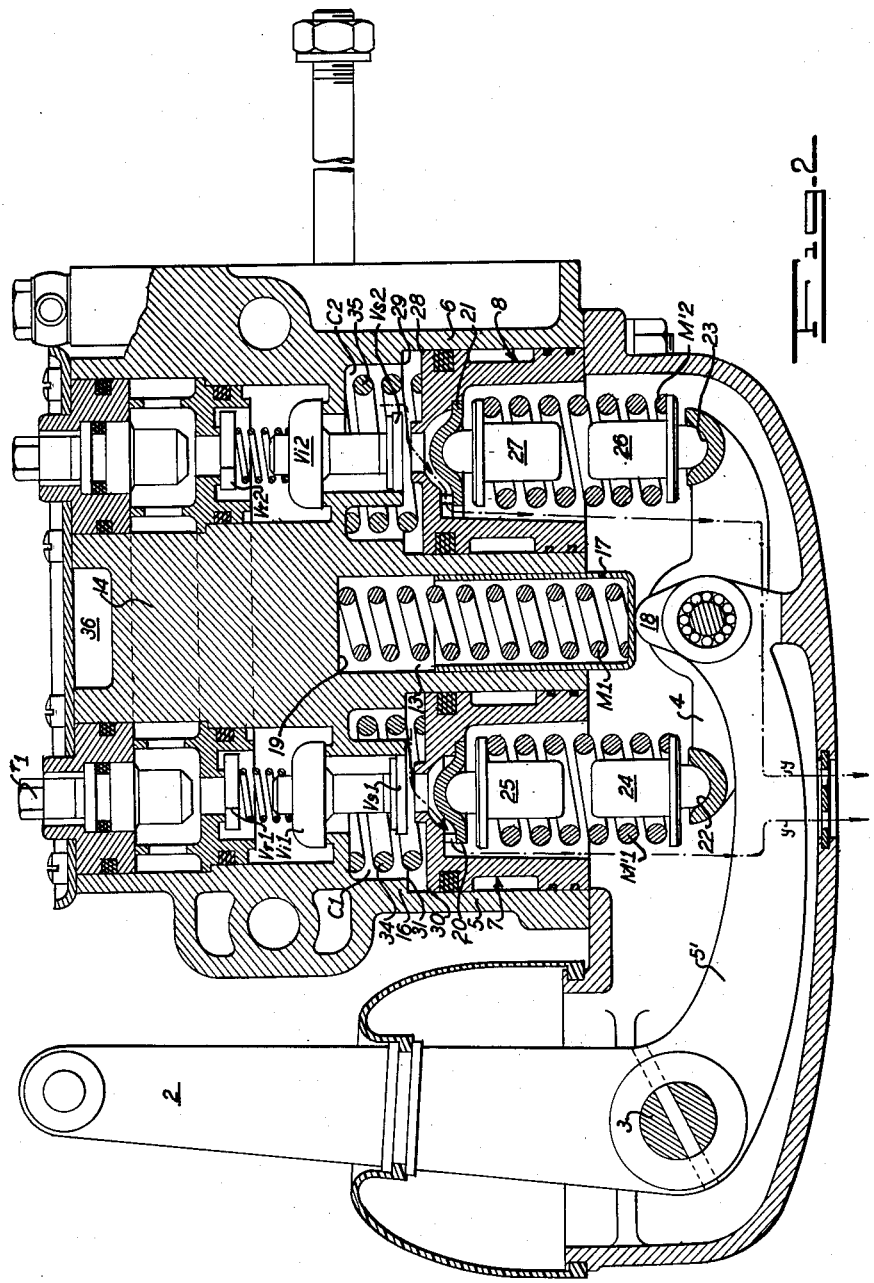
FIG. 2 shows an actual embodiment of the invention.

The two valve assemblies shown in the drawings in FIG. 1 and FIG. 2 essentially comprise seal valves Vr1 and Vr2, inlet valves Vi1 and, respectively, Vi2, and outlet valves Vs1 and, respectively, Vs2.

With particular reference to FIG. 2, the valve assembly shown at the left thereat comprises, as viewed from top to bottom, the seal valve Vr1 which cooperates with a seat beneath cock r. Inlet valve Vi1 is mechanically connected with valve Vr1 by a spring. The outlet valve Vs1 is mounted on the same stem of valve Vi1 and therebeneath. A spring 34 biases a piston 7 having a centrally bored seat cooperating at its top opening with valve Vs1 and at its lower opening with a hemispherical cup member 20. A biasing spring M'1 is inserted between two retaining members 25 and 24. Retaining member 24, the lower member has a hemispherical extension capable of nearly universal cooperation with a hemispherical recess 22 formed in a toggle or beam 4.

The right side valve assembly in FIG. 2, is symmetrical to the aforenoted valve assembly. The elements making up the right side valve assembly are from top to bottom, a seal valve Vr2, an inlet valve Vi2, an outlet valve Vs2, a biasing spring 35 for piston 8, a biasing spring M'2 urging cup 21 upwardly and spring retaining members 27 and 26, the lower of which, i.e. 26, cooperates with a recess 23 of the toggle or beam 4.

5 and 6 are the cylindrical borings adapted to slidably house pistons 7 and 8, respectively therein.

On the extreme left side of FIG. 2 there is visible a bell-crank lever pivoted at 3 and comprised of two arms, 2 and 5' angularly spaced apart at approximately right angles. The innermost end of arm 5' bears a boring adapted to receive a pivot which is centrally located on the toggle 4 and is solid therewith. Preferably, the innermost end 5' of the bell-crank lever 2—5' is of arcuate shape but this is not an essential feature. This innermost end 5' of said bell-crank lever 2—5' has a generally upwardly directed ear or lug 18, the purpose of which will be disclosed hereinafter. Intermediate the two valve assemblies is body 14 of the valve control mechanism of the invention has a downwardly opening cylindrical recess 13 adapted to house a spring M1 and a thimble member 17 slidably lodged in said recess 13. More particularly, the upper-most coil of spring M1 abuts against the top wall of recess 13, whereas the lowermost coil of spring M1 abuts against the inner bottom wall of thimble 17. The outer bottom wall of thimble 17 cooperates with the extension 18. The chamber $C_1$ and $C_2$ are connected to the sections $F_1$ and $F_2$ in FIG. 1. The lower openings in these chambers define outlet ports so that discharged air can escape through the central borings provided in each of the pistons 7 and 8 and through bottom holes specially provided on the casing. Any formed condensate drains from the device by following the route marked by the dotted lines y—y (FIG. 2).

Finally, if the springs M'1 and M'2 are of different strength with respect to one another, they provide the "time differential" necessary for obtaining the advanced, or retarded, entrance in operation of one valve assembly with respect to the other one, whereas, if they are of equal strength, they provide equal thrust and stroke, and, consequently, the simultaneous operation of the two sections of the braking system. 36, FIG. 2 is a recess to fit cock $r_3$ (FIG. 1).

At this stage, the operability of the device can be readily appreciated, as well as the function of the resilient member M1.

As a matter of fact, as the driver of the vehicle presses the brake actuating pedal (schematically shown in FIG. 1) which is coupled to the arm 2 of the bell-crank lever 2—5' a negative (counterclockwise) moment is imparted thereto. Due to the pivotal connection provided at 3, arm 5' receives a positive (clockwise) moment so that the end 18' and the toggle 4 are lifted against the bias of the springs M'1, M'2 and of the differential spring M1, thus making possible actuation of the valve members. A load applied to the brake pedal counteracts the pneumatic reaction against the upper face of the pistons and the bias of the springs urging the valve members. Since a certain valve control mechanism is generally designed for a certain load, when the load is varied, it is sufficient, according to the invention, to replace the resilient means M1 by another resilient means the strength of which be sufficient to neutralize the load differential.

The respective strokes of the springs biasing the valve members proper can also be adjusted either by changing the heights of the spring retaining members such as 25, 24 and 27, 26 respectively (FIG. 2) or by changing the respective strengths of the springs M'1 and M'2. Thus, the variability of the strengths of the springs, and especially of the resilient member M1 provided according to the invention and of the heights of the spring retaining members such as 25—24 and 27—26 offers so wide a choice that it is always possible, by skillfully combining all these variables or a part thereof, to fulfill even the most disparate requirements.

Figure 3:
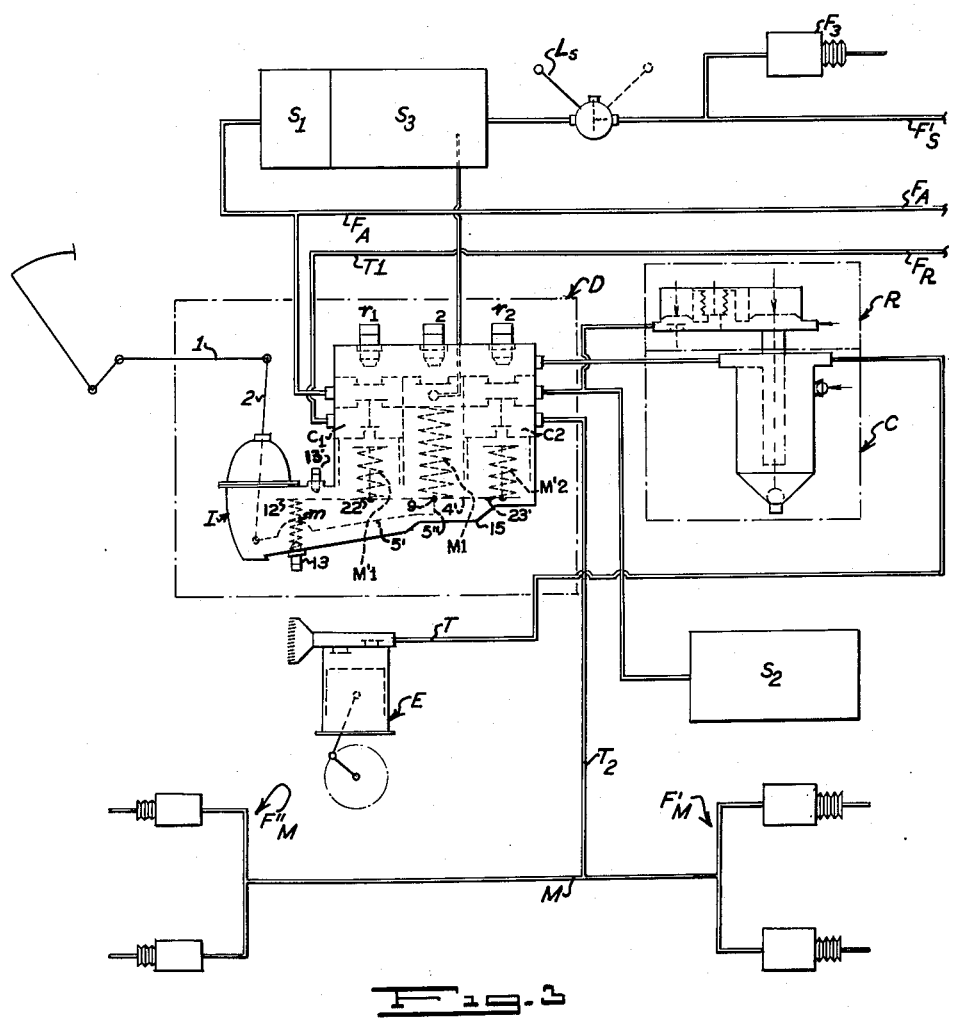
FIG. 3 is a diagrammatic illustration of another preferred embodiment of the invention.

The diagram of FIG. 3 refers to two further particular embodiments of the control linkage adapted to provide the desired "time differential" in the action of the various sections of a braking device.

According to one of these two further embodiments of the valve control mechanism of the invention, and more particularly of the actuating linkage therefor, the mechanism comprises a casing having a stepped bottom well comprising at least two consecutive stairlike surfaces, a plurality of spring biased valve members housed in said casing, each of said biased valve members being adapted to control the opening of fluid inlet and outlet ports formed in said casing, an actuating toggle for thrusting said valve members against the bias of the respective springs, a bell-crank lever for lifting said actuating toggle pivotally connected to one end thereof, a first biasing member mounted intermediate two adjacent spring biased valve members for biasing said bell-crank lever, one end of said toggle being arrested in its downward stroke by one of said stairlike surfaces of said bottom wall of said casing, the other end of said toggle being upwardly biased by a screwably adjustable second biasing member, the end of said bell-crank lever where said toggle is pivotally connected being arrested in its downward stroke by another of said stairlike surface of said bottom wall of said casing, this other stairlike surface being at a level lower than that of the first named stairlike surface.

According to still another embodiment of the invention, the valve control mechanism briefly described in the preceding paragraph is completed by a rigid screwable adjusting member capable of arresting the upward stroke of the end of the toggle which is upwardly biased by the second screwably adjustable biasing member. The rigid screwable adjusting member is installed through a wall of the mechanism casing confronting the bottom wall thereof and said screwably adjustable second biasing member.

Referring now more particularly to the diagram of FIG. 3, the braking system shown therein essentially comprises a compressor E, a line T leading from E, to the air cleaner C and regulator R, whereupon compressed air may flow, through a channel provided in the valve control mechanism in which inlet ports open, to the reservoirs $S_1$, $S_3$ and $S_2$. For convenience, the reservoirs $S_1$ and $S_3$ can be installed end-to-end. The diagram of FIG. 3 clearly shows the general arrangement of the pipings. T1 leads from the control mechanism D to the braking $F_R$ of the trailer. $S_3$ is adapted to feed with compressed air, besides the control mechanism D, an emergency line leading to the emergency brakes $F_S$ and $F'_S$ of the trailer, and also various ancillary apparatus.

A lever $L_S$ in the line to $F'_S$ operates a conventional three-way cock for establishing or cutting off communication between $S_3$ and the emergency line aforesaid. A further supply line for auxiliary services can be fed by $S_1$ through the supplementary line $F_A$. T2 leads from the valve control mechanism to the braking sections $F'_M$ and $F''_M$ which are installed on the tractor vehicle, through the branched line M.

The valve assemblies of the control mechanism D need not be described in detail, since these assemblies have been described in connection with FIGS. 1 and 2, and the same reference numerals refer to equal or alike parts.

The difference resides in the actuating linkage provided for the mechanism D.

In FIG. 3 attention is directed to the stepped configuration of the bottom wall 15 of mechanism D. It will be seen, a furthermore, that the "step" located on the right of D, beneath spring M′2 is set at a higher level than the "step" located beneath spring M1.

A bell crank lever 2—5′ is provided and its free innermost end 5″ has a short upwardly directed extension to which toggle 4′ is pivotally connected at 9.

On viewing the valve control mechanism D FIG. 3 from right to left, it is seen that spring M′2 rests on the right end 23′ of toggle 4′, spring M1 on the point 9 of pivotal connection of 5′ and 4′, and spring M′1 on an intermediate point 22 of toggle 4′.

The left end of toggle 4′ is upwardly biased by a coil spring m, the force of which can be adjusted by manipulation of a screw 13 engaged in a tapped hole formed in the bottom wall of the casing I. A screw 13′ is advanceable in the top wall of casing I, in a location which is approximately in front of spring m and screw 13. The screw 13 serves to limit the upward movement of the right end of toggle 4′, that is, the movement due to the actuation of the toggle by the linkage 1, 2—5′ as will be more detailedly set forth in connection with the description of the operation of the device. It should be borne in mind that FIG. 3 shows the actuating mechanism of D in a position which is lifted to some extent with respect to the rest position: this has been made for the sake of clarity and in order that the various component parts might be clearly shown even in a somewhat schematic way.

When the actuating linkage is in its rest position, downward bias of M1 urges points 5″ of arm 5′, and 23′ of toggle 4′ to rest on the respective confronting stairlike surface of the bottom wall 15 of I.

The operation of the actuating linkage is as follows:

As the driver presses the brake pedal, a tie-rod 1 connected to the pedal lever and pivoted to the bell-crank lever 2—5′ (pivoted to the casing I), imparts to the bell-crank lever 2—5′ a negative or counterclockwise moment. Due to the arrangement of the linkage the toggle 4, if it were not biased by m would be upwardly and parallely displaced (apart of course from difference in strength between springs M′1 and M′2). However, the spring force of m, applies to the toggle 4 a positive or clockwise moment which, due to the pivotal connection at 9, urges point 23′ to rest on the bottom wall 15 of casing I.

Due to the positive moment imparted by m, the point 23′ will continue to rest on the bottom wall of casing I so that toggle 4′ will rotate about 23′. Consequently point 12 (left end of 4′) and 22 will be lifted thus causing toggle 4′ to press M′1. Accordingly the valve assembly controlled by M′1 is operated, whereas the other section, controlled by M′2, still remains inoperative.

As pressure on the brake pedal is increased, M′1 becomes further compressed so that the valve assembly controlled thereby permits the compressed braking fluid to flow into the braking section $F_R$ of the trailer vehicle. On applying further pressure on the brake pedal, the point 23′ of 4′ is raised so that the toggle 4′ is bodily lifted to press the spring M′2. Consequently, the valve assembly controlled by M′2 is put in operative position so that compressed air is allowed to inflow into the braking sections F′M and F″M of the tractor vehicle. The basic principle underlying the operability of the spring m will be more clearly understood on examining the graph of FIG. 4. It is to be noted that in the description of the operation of the device shown in FIG. 3 it has been assumed up to now that the screw 13′ was inoperative. The function of screw 13′ will be explained in connection with the graphs in FIGS. 5 and 6.

Figure 4:
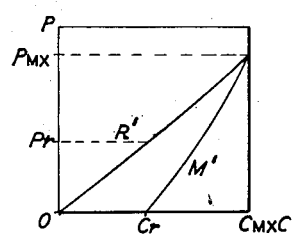
FIGS. 4, 5, 6 are graphs which illustrate the variation of the pressures in the various sections of a braking system fitted with the valve control mechanism of the invention as a function of the strokes of (or of the loads on) the resilient members which act upon the valve members proper of the device.

In FIG. 4, the deflection of springs M′1 and M′2 are plotted along the abscissae and on the ordinates the pressures in the compression chambers C1 (curve R′) and C2 (curve M′) of the valve assemblies controlled by M′1 and M′2, respectively are plotted. Referring to the graph in FIG. 4, let us assume that $Cmx$ is the overall stroke of the two springs M′1 and M′2 and $pmx$ the maximum air pressure corresponding to the stroke $Cmx$. The graph shows that as soon as the brake pedal is depressed, the spring M′1 enters operation and therefore the pressure of air within chamber C1 (FIGS. 1, 2, 3) is increased in direct proportion to the stroke. The spring M′2 is inoperative during this period and will not enter operation until the pressure within C1 reaches a certain minimum value, $p_r$. That is to say that the spring M′2 begins its stroke when the spring M′1 has traveled over the stroke $Cr$. $Cr$ is the value on the abscissa corresponding to the ordinate $p_r$ on the curve R′ This means that the brakes of the trailer vehicle have effected a braking action prior to those of the tractor vehicle. In practice, this time differential or lag depends upon the srengths of the springs M′1, M′2 and m. Under any circumstances, the point 23′ of 4′ (FIG. 3) will be upwardly displaced after 22 has been displaced. The graph in FIG. 4 also shows that the pressure in the chamber C2 (controlled by M′2, see curve M′ in the graph FIG. 4) will be increased proportionally to the stroke but will have a lower value than the pressure in C1 until the stroke $Cmx$ has been achieved. This is due to the lagging action of the spring m which counteracts the upward movement of 23′. The spring m (FIG. 3) is designed to be fully unloaded as the pistons 7 and 8 have travelled over a certain maximum stroke Cmx and the cylinders 5 and 6 are completely open. At this stage the same maximum pressure pmx will exist in the two cylinders 5 and 6.

Figure 5:
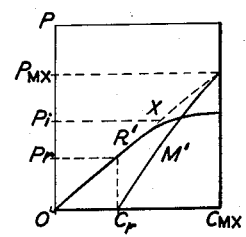
Figure 6:
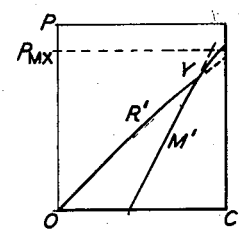

The presence of the adjusting screw 13 of the spring $m$ and of the screw 13' will be more clearly understood by reference to the graphs of FIGS. 5 and 6, taken in connection with FIG. 3.

Referring firstly to the graph in FIG. 5 it can be readily appreciated that in correspondence to the abscissa $x$ of curve R' there is a sharp point, beyond which the curve R' becomes nearly flat, whereas the pressure in chamber C2 (on the right in distributor D, FIG. 3) is increased proportionally to the stroke of the corresponding spring M'2.

A graph such as that shown FIG. 5 is illustrative of the case in which the screw 13' protrudes somewhat within the casing I (FIG. 3). As the left side of toggle 4' abuts on the pointed end of screw 13', the same toggle 4' will rotate about said end of said screw 13' so that the upward motion of point 23' will be continued almost normally, whereas the upward motion of point 22 will be almost entirely impeded. As a consequence of this fact, the pressure within C2 will increase (curve M') whereas the pressure within C1 will remain in the neighborhood of the value $p_1$ corresponding to the abscissa $x$. The "tail" portions of the curves R' and M', that is the portions beyond $x$ reproduce a counterclockwise rotation of toggle 4' about the pointed end of the screw 13'.

The conditions represented by the graph FIG. 5 are of advantage when it is desired to have a time advance in the braking of the trailer and, subsequently (i.e. beyond $x$) a braking force on the tractor having a greater magnitude than the braking force on the trailer. This necessity is imposed by the tractor, being, very often, heavier than the trailer so as to require a more energetic braking action than the trailer in the final phase of the braking, while maintaining a certain time differential in the favor of the trailer as far as the initial phase of braking is concerned.

By manipulating the screws 13 and 13' it is possible to obtain practically any combination of time lags and magnitudes of braking action.

The graph in FIG. 6 is exemplary of some of these possible combinations.

It is also possible to have the two curves R' (trailer) and M' (tractor) intersecting at a point $y$ beyond which the proper adjustment of the screws 13 and 13' may provide an equal variation of the braking pressures for the tractor and the trailer (full line curve between the dotted prolongations of the curves R' and M' of FIG. 6).

In practice, the graphs representing the braking pressures for the tractor and the trailer can be infinite in number so that a wide selection may be made with regard to the variability of the braking pressures and time lags of one braking section with respect to others. This selection affords to the apparatus described a versatility of use which has not been exhibited by any of the valve control mechanisms suggested by the prior and contemporary arts.

What is claimed is:
1. A control valve mechanism for operating in succession pneumatically actuated devices, comprising, in combination, a casing having a stepped bottom wall comprising at least two consecutive stairlike surfaces, a plurality of valve members housed in said casing, springs biasing said valve members each of said biased valve members being adapted to control the opening of fluid inlet and outlet ports formed in said casing, an actuating toggle for thrusting said valve members against the bias of the respective springs, a bell-crank lever for lifting said actuating toggle and pivotally connected to one end thereof, a first biasing member mounted intermediate between every two adjacent spring-biased valve members for biasing said bell-crank lever, one end of said toggle being arrested in its downward stroke by one of said stairlike surfaces of said bottom wall of said casing, an adjustable second biasing member upwardly biasing the other end of said toggle, the end of said bell-crank lever whereto said toggle is pivotally connected being arrested in its downward stroke by another of said stairlike surfaces of said bottom wall of said casing, said other stairlike surface being at a level lower than that of the first named stairlike surface.

2. A control valve mechanism for operating in succession pneumatically actuated devices, comprising, in combination, a casing having a stepped bottom wall comprising at least two consecutive stairlike surfaces, a plurality of valve members housed in said casing, springs biasing said valve members, each of said biased valve members being adapted to control the opening of fluid inlet and outlet ports formed in said casing, an actuating toggle for thrusting said valve members against the bias of the respective springs, a bell-crank lever for lifting said actuating toggle pivotally connected to one end thereof, a first biasing member mounted between every two adjacent spring-biased valve members for biasing said bell-crank lever, one end of said toggle being arrested in its downward stroke by one of said stairlike surfaces of said bottom wall of said casing, an adjustable second biasing member, upwardly biasing the other end of said toggle a rigid adjustable member extending through a wall of said casing confronting the bottom wall thereof and said screwably adjustable second biasing member, the end of said bell-crank lever whereto said toggle is pivotally connected being arrested in its downward stroke by another of said stairlike surfaces of said bottom wall of said casing, said other stairlike surface being at a lever lower than that of the first named stairlike surface.

References Cited in the file of this patent
UNITED STATES PATENTS

| | | |
|---|---|---|
| 1,549,772 | Hukill | Aug. 18, 1925 |
| 1,844,632 | Bragg et al. | Feb. 9, 1932 |
| 2,515,946 | Cadman | July 18, 1950 |
| 2,680,654 | Edge et al. | June 8, 1954 |

FOREIGN PATENTS

| | | |
|---|---|---|
| 315,375 | Italy | Feb. 23, 1934 |
| 236,143 | Switzerland | June 1, 1945 |